United States Patent [19]

McKenna

[11] Patent Number: 4,514,109

[45] Date of Patent: Apr. 30, 1985

[54] CIRCULAR LOCKING DEVICE

[76] Inventor: James J. McKenna, 157 Parkview Dr., Ancaster, Ontario, Canada

[21] Appl. No.: 345,064

[22] Filed: Feb. 2, 1982

[51] Int. Cl.³ .............................................. F16D 1/06
[52] U.S. Cl. .................................. 403/370; 403/365; 403/372; 192/74
[58] Field of Search ............... 403/373, 370, 364, 371, 403/372, 365; 192/74

[56] References Cited

U.S. PATENT DOCUMENTS 2,709,607  5/1955  Wikander ............................ 403/372
3,033,622  5/1962  Renner ........................... 403/372 X
3,861,815  1/1975  Landaeus ........................... 403/370
3,995,967  12/1976  Haller ................................ 403/370

Primary Examiner—Cornelius J. Husar
Assistant Examiner—Todd G. Williams

[57] ABSTRACT

A circular coupling for interconnecting a shaft to a bearing is disclosed. The coupling comprises a coil having a plurality of turns adapted to surround the shaft, as positioned within the inner race of the bearing. The coil is axially compressed for displacing coil turns relative to one another to frictionally bind the shaft to the bearing inner race. Upon releasing the compression on the coil, the bearing shaft may be removed from the shaft.

11 Claims, 9 Drawing Figures

CIRCULAR LOCKING DEVICE

FIELD OF THE INVENTION

This invention relates to circular couplings and more particularly to couplings used for interconnecting an inner rigid element to a surrounding outer rigid element.

BACKGROUND OF THE INVENTION

There are many known approaches for connecting a circular rigid shaft to an outer machine element having a circular bore. Press fits are commonly used where the shaft diameter is slightly larger than the bore diameter of the machine element and pressure is used to force the machine element onto the shaft. Alternatively shrink fits can be used by heating the machine element to expand the bore diameter, the shaft upon being placed in the bore and, upon cooling of the machine element, the shrink fit is achieved. Such interconnections are not always convenient in the field and are difficult to disengage.

Mechanical couplers employing the user of wedges have been commonly used. An example of this type of mechanical coupler is disclosed in U.S. Pat. No. 2,956,826. The use of wedges or tapered sleeves provide a good frictional binding between a shaft and surrounding machine element; however, the wedges sometimes interlock and prevent easy disengagement of the shaft from the machined element. Scoring of the shaft may also result. Other types of tapered sleeve interconnection are disclosed in U.S. Pat. Nos. 3,957,381 and 4,202,644 and in Canadian Pat. No. 632,967. Other common approaches to interconnecting shafts or the like to surrounding elements are disclosed in U.S. Pat. Nos. 3,986,583, 4,127,741 and Canadian Pat. Nos. 130,683, 378,366 and 934,530.

A coupling using tiltable, eliptical independent discs is disclosed in U.S. Pat. No. 3,866,726. This form of coupling is acceptable when used as a clutch or brake. When the shaft is rotated, the flywheel moves inwardly of the shaft to cause a tilting of the discs and thereby bind the driven flywheel to the outer surrounding member. The discs have enlarged central apertures which provide for this tilting about the driven member so as to engage the surrounding member to be driven. However, such an arrangement would be unacceptable in providing a secure interconnection of drive shaft to bearings and the like, because the enlarged disc apertures would not assure a concentric mounting of a bearing on a shaft.

Another form of connector, which may be used as a clutch, is disclosed in U.S. Pat. No. 2,922,220. A coil spring is used. When the coil has one end turned circumferentially, the coil contracts to effect a binding between a shaft and outer surrounding member. Another approach in using a coil to form an interconnection is disclosed in U.S. Pat. No. 3,888,598. The wire coil is mounted between a shaft and a member to be driven. The coil is supported between the shaft and the outer member by a support having a helical groove, so as to contain and hold the coil in place. By rotating one end of the coil, the coil is expanded as held within the groove to effect a binding between the shaft and the surrounding member.

Elastomeric materials have also been used in providing couplings. An example of this type of coupling is disclosed in U.S. Pat. No. 3,548,714. The elastomeric material is axially squeezed to couple a shaft to surrounding member. By squeezing the elastomeric material, it forces the material radially outwardly to form the connection.

Spieth disclosed in Auslegeschrift No. 19 38 449 a coupling, whereby axial compression of an insert between shaft and bearing provides a connection. The retaining ring, as inserted between the shaft and outer member, requires extensive metal forming and is, therefore, relatively expensive. The retaining ring is axially compressed to cause expansion inwardly and outwardly of the ring to effect a binding between shaft and surrounding element. Such axial squeezing of the retaining ring induces fatigue stresses in the ring because of the flexing needed to connect the shaft to the bearing member. In so compressing the retaining ring, the elastic limits may be exceeded and as a result prevent disassembly of the bearing from the shaft.

The coupling, according to this invention, overcomes a number of the above problems to provide an inexpensive type of coupling which may be readily used in the field and requires a minimum, if any, changes at all to the shaft and surrounding element to be coupled.

SUMMARY OF THE INVENTION

A circular coupling, according to this invention, uses a coil arrangement of at least one coil having a plurality of turns for positioning between an inner rigid element and an outer rigid element. The coil arrangement is compressed axially, as located between the elements, to frictionally bind the inner element to the outer element.

According to an aspect of the invention, means is provided and adapted to compress the coil arrangement along its axial length for displacing contacting coil turns of the coil arrangement to engage the inner element with the outer element. The compression means is capable of compressing the coil to an extent to provide sufficient frictional engagement of the coil arrangement with the inner and outer elements. The configuration of the inner and outer surfaces is such to provide sufficient areas of frictional contact to interconnect the elements.

The size of the hole in the outer element may be selected to minimize the extent of the coil turn displacement by the compression means in frictionally engaging the inner and outer elements.

The coil turns may be shaped to direct relative displacement of the turns to widen the coil arrangement between the inner and outer elements when axially compressed to effect the frictional binding. The coil turns may be prearranged to direct movement of selected turns, either inwardly or outwardly of the coil arrangement, as it is compressed. In predetermining the coil turn movements during connection of the inner and outer elements, concentricity of the elements may be assured.

Due to the relative displacement of the coil turns, minimal yield stresses are exerted on the coil turns. Most of the compressive force is translated by the coil turns into frictional binding of the inner and outer elements. The coil turns are shaped so as to not seize or jam together and prevent disassembly. Instead upon release of the means for compressing the coil arrangement, the coil turns relax and allow disassembly.

BRIEF DESCRIPTION OF THE DRAWINGS

Preferred embodiments of the invention are shown in the drawings wherein.

DETAILED DESCRIPTION OF THE PREFERRED EMBODIMENTS

The circular coupling, according to this invention, may be used to contact various types of an inner element to an outer element having a hole or bore; for example, the mounting of a stub shaft in a drive pulley, securing of bearings to drive shafts, butt end joining of shafts, and the like. It is appreciated that the surface shapes of the inner element and of the hole in the outer element need not be circular. The inner element may be a shaft which has splines, scalloped portions, lobes, flats and the like. Similarly, the surface of the outer element hole may have similar irregularities. As will become apparent in the discussions of the preferred embodiments, the configuration of the surfaces of the inner and outer elements is always such to provide sufficient areas of frictional contact with the compressed coil to effect the desired strength of interconnection between the inner and outer elements.

Figure 1:
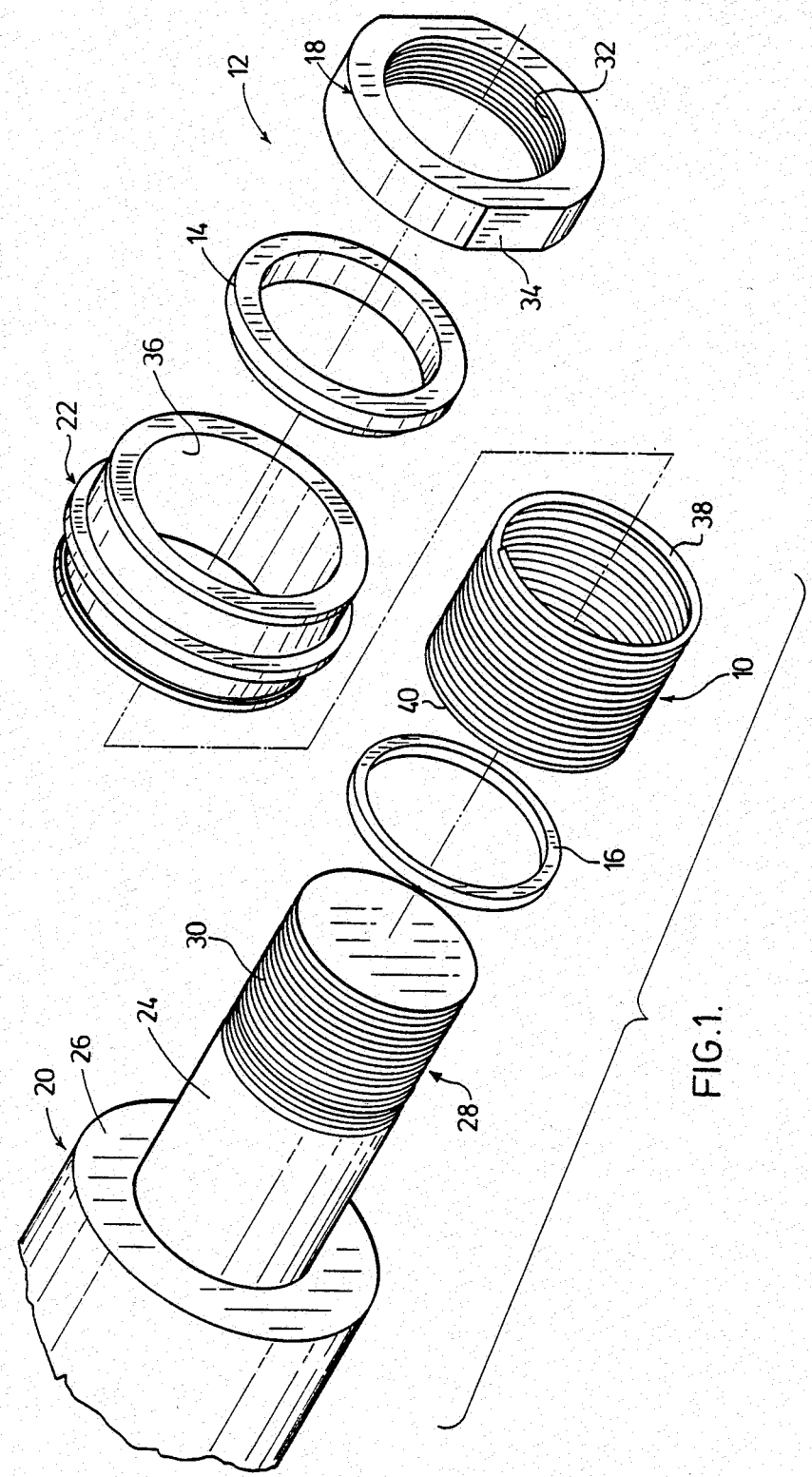
FIG. 1 is an exploded view of the circular coupling, according to this invention, for interconnecting an inner element to an outer element.

For purposes of describing aspects of the invention, the circular coupling, as shown in FIG. 1, is used to connect a circular driveshaft to a circular bearing inner race. The circular coupling comprises a metal coil arrangement in the form of a single coil 10 and a compression device generally designated 12. The compression device consists of inserts 14 and 16 for each end of the coil 10 and a threaded collar 18, which threadeadably engages a driveshaft 20 for axially compressing the coil 10 to cause a frictional binding of the driveshaft 20 to the bearing inner race 22. Driveshaft 20 has a turned spindle portion 24 with an abutment 26. The free end 28 of the driveshaft is threaded at 30 to mate with the internal threads 32 on the collar 18. The collar 18 is provided with flats 34 to facilitate the use of a tool in tightening the collar onto the driveshaft.

The coil 10 of the circular coupling, when in its relaxed state, has an internal diameter which will permit placement of the coil onto the spindle portion 24 of the driveshaft. With the coil on the driveshaft, it has an external diameter which fits within the hole or bore 36 to permit sliding of the inner race 22 of a bearing onto the coil 10.

To ensure that the coil ends 38 and 40 are contained within the bore 36 of the inner bearing race, insert 16 is slid over the spindle 24 and contacts the abutment 26 as it lies against the end 40 of the coil 10. Similarly insert 14 is also positioned over the spindle 24 as it contacts coil end 38. With the unit assembled and the collar 18 tightened, adjacent coil turns move in opposite directions as they lie between the driveshaft and bearing inner race to effect an interconnection of the two.

Figure 2:
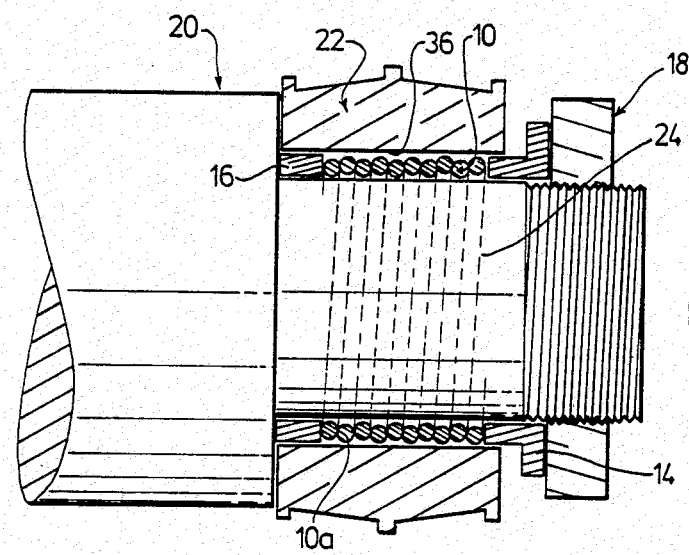
FIG. 2 is a cross-sectional view of the assembled coupling of FIG. 1.

Turning to FIG. 2, the assembly of the coupling is shown. The driveshaft 20 has the coil 10 in its relaxed state positioned over the spindle 24. The device for compressing axially the coil has its insert portions 14 and 16 located to contain the coil within the bore 36 of the bearing inner race 22. The threaded collar 18 contacts the insert 14.

Figure 3:
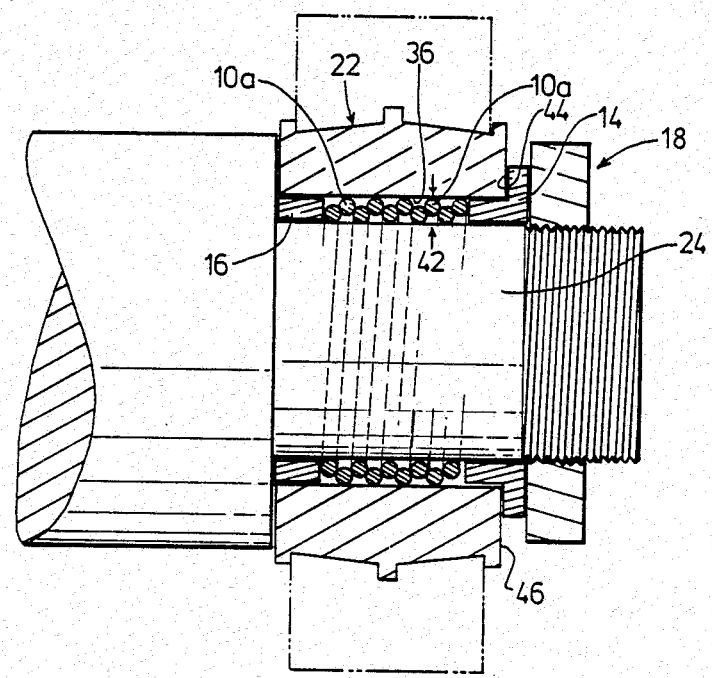
FIG. 3 is a cross-sectional view of the assembled coupling of FIG. 1 with the single coil axially compressed to effect an interconnection of the inner and outer elements.

Upon tightening of the collar 18 with an appropriate tool, the coil 10 is axially compressed, as shown in FIG. 3, to displace the turns 10a of the coil relative to one another in the space 42 until the coil turns about the spindle 24 and the bore 36 of the bearing inner race 22. This space is defined by the difference in diameters of the spindle 24 and the bore 36. The pressure which the displaced individual turns 10a of the coil 10 exert on the shaft and bearing is determined by the torque exerted on the threaded collar 18. With sufficient axial compression exerted on the coil by a predetermined degree of torque on the collar 18, the thickened coil section with its turns so displaced frictionally binds or interconnects the spindle 24 to the bearing inner race 22. Depending upon the anticipated loads to be exerted on the bearing inner race 22, this determines the extent to which the coil is compressed to create the needed frictional binding which can withstand any anticipated the loads which could cause a relative movement between the bearing inner race 22 and spindle 24. Such movement is commonly referred to as "creep" in the bearing art.

The positioning of the inserts 14 and 16 with their relative thicknesses always ensures that the coil 10 is located within the bearing inner race 22. It is appreciated that a portion of the coil cannot lie outside of the bearing inner race, because as it is axially compressed, it would expand and jam the collar 18. The dimensioning of the insert 14 may be such that its inner face 44 abuts edge 46 of the bearing race to determine the extent to which the coil is compressed. This may be used as a stop to determine the pressure exerted on the coil in forming the interconnection with the bearing inner race 22, when the tolerances on the spindle diameter 24, the bore diameter 36 and the overall width of the coil are predetermined. For example, if the coil 10 is overcompressed, it may exert too great of an outward radial force on the bearing inner race 22 which could cause the inner race to expand, decreasing the gap between the bearing members and the outer race and causing increased bearing wear. In other situations it may, however, be desirable to simply use a torque wrench of collar 18 and by trial and error, establish the torque required on the collar 18 to effect the desired frictional binding of shaft to bearing inner race so as to always accommodate the loads to be exerted on the bearing inner race to prevent "creep". In situations where it is desired to firmly interconnect a driveshaft to a pulley or the like, where known torques will be applied to the pulley, the coil is compressed to an extent which will exert sufficient frictional binding between the driveshaft and the pulley to always withstand the torque loads.

The coupling, therefore, provides a system which is readily usable in the field and requires minimum modifications to driveshafts and the like to enable use of the coupling. The coil, as axially compressed, readily accommodates variations in the spindle diameter or the bore diameter.

The coil 10, as shown in FIG. 2, is adapted to provide precision coupling by having its individual turns 10a prearranged so as to be slightly displaced relative to one another. When the coil is axially compressed, it assumes the configuration shown in FIG. 3 where adjacent turns are moved in opposite directions. For sake of illustration in FIG. 3, the section through the coil shows that the displacement occurs along a single plane. It is appreciated, however, that in actual use such displacement may occur at different spots around the coil as the compressed coil is viewed along its axial length. However, by predetermining the direction of coil turn displacement, a more symmetrical arrangement is achieved so that the concentricity of the bearing inner race 22 relative to the driveshaft spindle 24 is assured.

Figure 4:
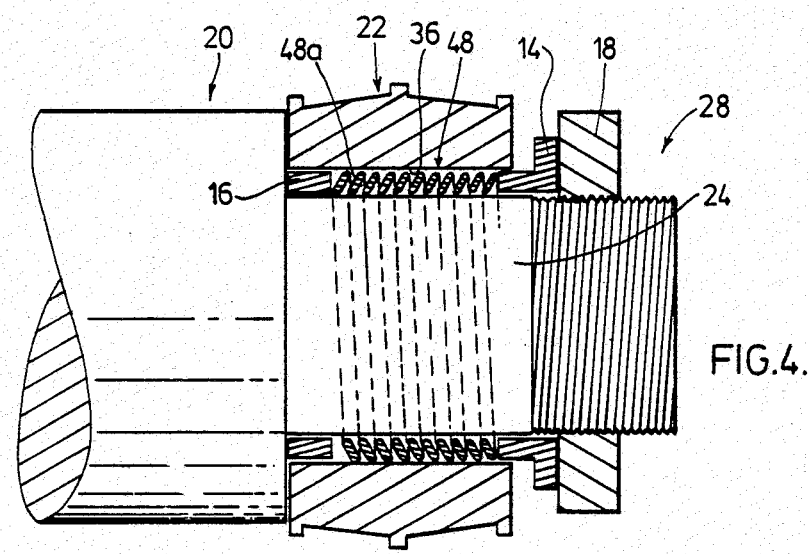
FIG. 4 is a cross-section of an alternate embodiment of the invention for interconnecting inner and outer elements.

FIG. 4 shows an alternate embodiment for the coil arrangement used in the circular coupling. The coil arrangement 48 consists of a single metal coil having individual turns 48a which are sloped relative to the axis of spindle 24. The turns are oblong in cross-section with rounded edges as shown. The coil is located within bore 36 of the bearing inner race 22. Inserts 14 and 16 ensure location of the coil within the bore 36. The collar 18 is tightened on the threaded portion 28 to axially compress the coil 48 and cause relative displacement in the coil turns 48a, to thereby in essence thicken the cross-section of the coil.

Figure 5:
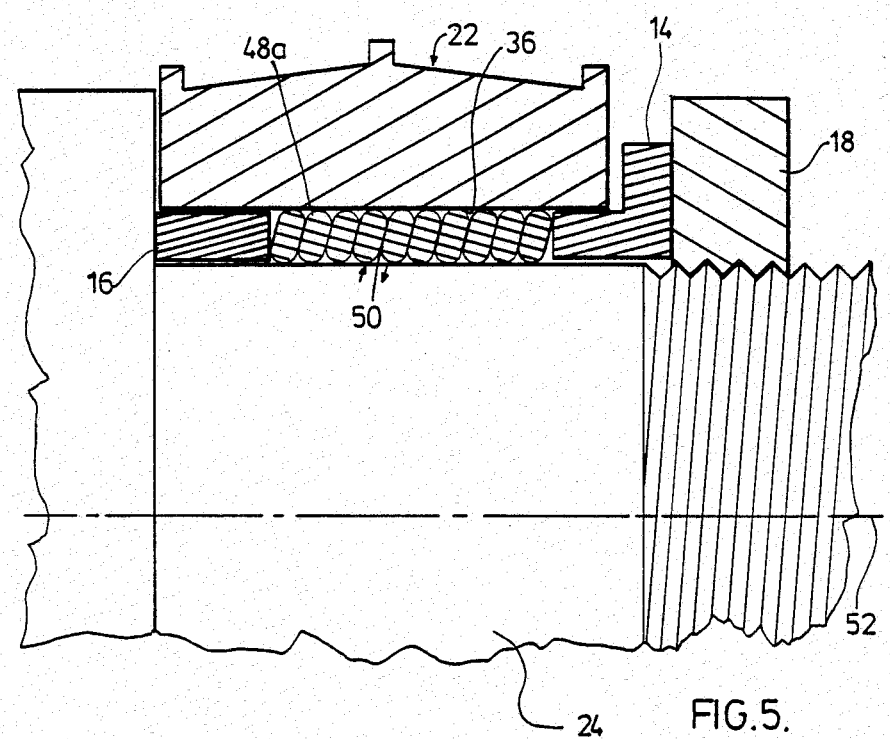
FIG. 5 is the section of FIG. 4 showing the alternative form for the coupling coil as axially compressed for interconnecting the inner and outer elements.

This relationship is shown more clearly in FIG. 5. The individual coil turns 48a, as the coil is axially compressed, causes the turns to contact one another and be displaced relative to one another in the direction of arrows 50, so that the slopes of the individual turns is increased relative to the longitudinal axis 52 of the shaft spindle 24. This slight uprighting of coil turns 48a increases the coil section thickness between the bore 36 and shaft 24, so as to frictionally bind the shaft to the bearing inner race 22. The degree of torque exerted on the threaded collar 18 determines the frictional binding between the coil, the shaft and the bearing inner race. The torque exerted is always sufficient such that the frictional binding withstands anticipated loads exerted on the coupling during use.

Figure 6:
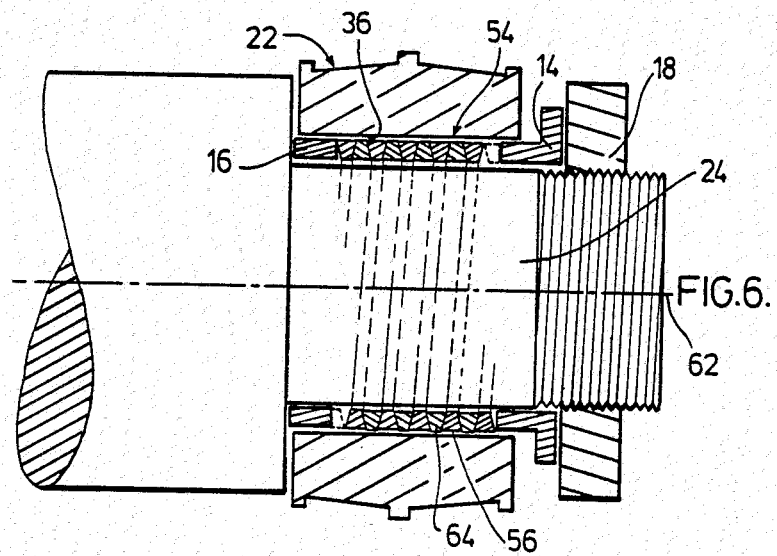
FIG. 6 is a cross-section showing yet a further alternate embodiment of the invention.
Figure 7:
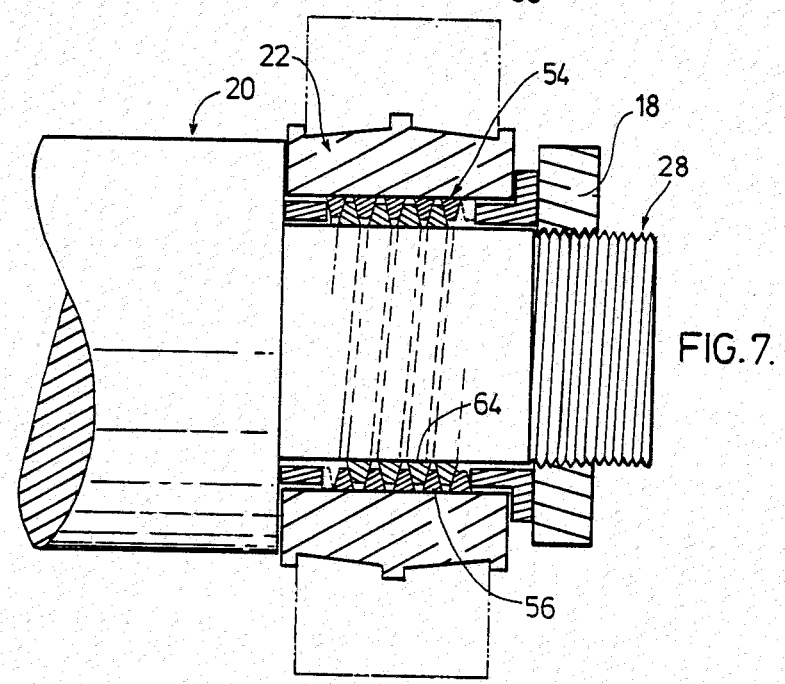
FIG. 7 is the cross-section of FIG. 6 with the alternate form of coupling coil axially compressed to interconnect the inner and outer elements.

Turning to FIG. 6, an alternative form 54 for the coil arrangement is shown. The coil arrangement is located over spindle 24 within bore 36 of bearing inner race 22. The inserts 14 and 16 contain the coil ends and collar 18 is used to axially compress the coil arrangement.

Figure 9:
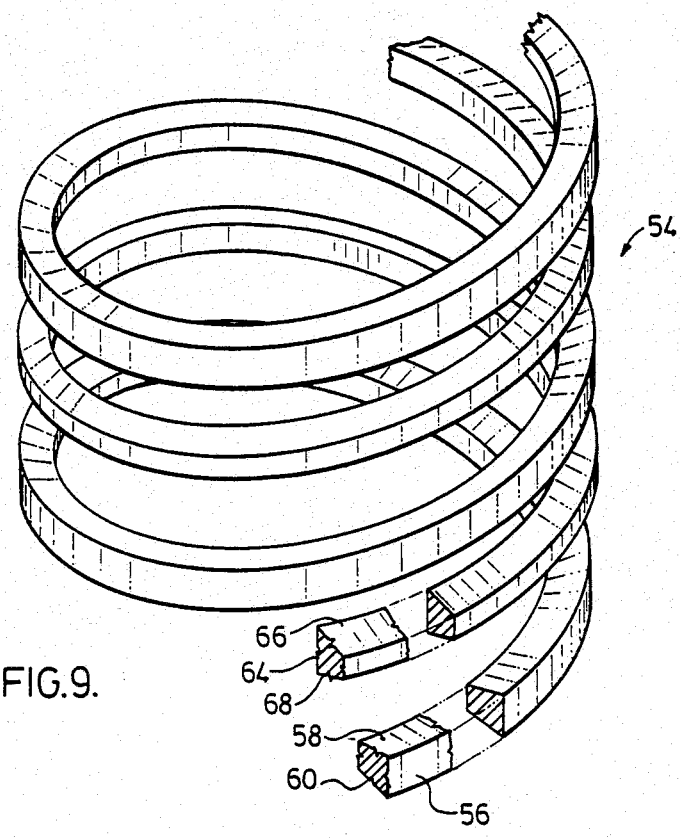
FIG. 9 is a perspective view of a portion of the coil arrangement construction used in the coupling of FIG. 6.

FIG. 9 shows in more detail the makeup of coil arrangement 54. The coil arrangement comprises two metal coils. The first coil turn 56 has sloped faces 58 and 60 which are tapered inwardly towards the shaft longitudinal axis 62. The second coil turn 64 has two surfaces 66 and 68 sloping toward one another so as to provide a taper in the coil turn 64, which is directed outwardly relative to the shaft axis 62. The two individual coils 56 and 64 are intertwined in the manner shown, to provide in cross-section mating surfaces for the coil turns 56 and 64 in the section shown in FIG. 6. Outer coil 56, i.e., the coil in contact with the outer machine element, has an axial length slightly greater than the axial length of inner coil 64, i.e., the coil in contact with the shaft, to accommodate the increase of axial length of the inner coil as the coil arrangement is compressed. Similarly, if the coil wire were circular or other shape which would provide the desired displacement of coil turns, the outer coil would be axially longer than the inner coil to accommodate the relative circumferential movement of the coil turns as the coil arrangement is compressed.

The collar 18 is tightened on the threaded end 28 of the shaft 20 to axially compress the coil 54. Due to the mating sloped surfaces of the first and second coil turns 56 and 64, the first coil turns 56 are urged outwardly while the second coil turns 64 are urged inwardly. The individual coil turns are thereby displaced relative to one another to bind the first coil 56 with the bearing inner race 22 and bind the second coil 64 with the shaft, by virtue of the coils frictionally engaging one another, the shaft is thereby interconnected to the bearing inner race. This movement of the relative coil turns is shown in more detail in FIG. 8. As the turns 56 and 64 move inwardly and outwardly, they also move circumferentially relative to one another. Such relative circumferential displacement is accommodated as the collar 18 is tightened onto the threaded shaft 28. The shapes for the coil turns 56 and 64 increase the surface area of frictional contact with the shaft spindle 24 and the inner race bore 36, due to the flat surfaces on turns 56 and 64. Thus this coil arrangement 54 is preferentially used in heavy duty applications, where greater torque loads are to be handled.

It is appreciated that with all embodiments of the invention, the coil arrangement, as compressed, does not result in the turns of the coil seizing against one another. Thus when the compression device is removed, the coil arrangement will relax and resume its original position about the shaft. It is apparent that, if the coil is made of a material which corrodes, such corrosion may prevent the coil from immediately relaxing; however, a blow with a hammer or the like readily breaks up the set in the coil caused by the corrosion, so that the coil may resume its original position. With the coil in its original position, the bearing can be readily removed from the shaft. Therefore, this type of coupling provides a very useful, releasable interconnection for inner and outer elements.

Figure 8:
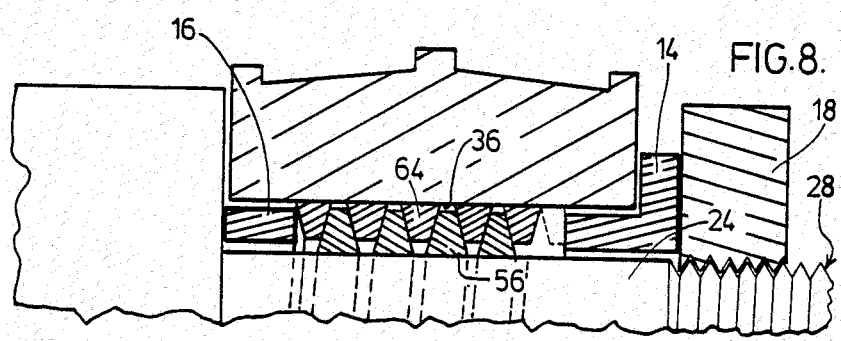
FIG. 8 is an enlarged view of a portion of the coil as compressed to show clearly the displacement of coil turns.

The embodiments of FIG. 6 demonstrates an instance where two coils are used in the coil arrangement. It is appreciated that the coil arrangement may also include two coils, each having circular wire or having tapered wire as best seen in FIG. 8 where one coil is of a smaller diameter than the other coil. When these two coils are intertwined, they assume a position similar to that shown in FIG. 2 so as to provide the prearrangement of coil turns, so that they more in opposite directions to the position shown in FIG. 3. Additionally, it is appreciated that any number of coils of a unit length may be used side by side within a long length of bearing all of the same diameter, so that when the coil arrangement of these multiple units is compressed, the interconnection is made.

It is also apparent that the configuration of the coil turns in the coil arrangement must always be such that there is sufficient frictional engagement between the turns, so that when the coupling is loaded the turns will not circumferentially move relative to one another. In the embodiments shown in the drawings, it is apparent that, when the coil arrangement is compressed, the coil turns, as they abut one another, are sufficiently compressed that the frictional engagement between them is greater than the forces exerted on the coupling when under load to resist any relative rotation of the outer element relative to the inner element.

The coupling, according to this invention, in using a coil arrangement to effect frictional binding of an inner element to an outer element greatly reduces stresses exerted on the connecting element. With devices of the prior art in using tapered sleeves or wedges or other elements which are axially compressed to provide deformation, the stresses in the connecting device may exceed yield stresses of the connector and result in deformation which jams the inner element to the outer element, thus complicating disassembly. In using a coil arrangement having shaped surfaces such that, upon axial compression, coil turns are displaced relative to one another, the yield stresses in the coil are kept to a minimum. Thus the compression exerted by the compression unit are converted principally into clamping force in connecting the inner and outer elements. The use of a coil arrangement also accommodates variations in tolerances where it is appreciated that the differences in diameters of the inner and outer elements preferably should be in the range of approximately 1.25 to 1.75 times the cross-section of a representative coil turn.

As mentioned, the coil may be of a metal, such as a steel alloy which is commonly used in steel coils and may be of the same type of alloy of the inner and outer elements. It is appreciated that other appropriate metal or non-metallic materials may be used, which has the necessary coefficient of friction. The selection of the materials may depend on the material of the elements to be joined and anticipated load which the connected elements are to withstand. A suitable non-metallic material for the coil is rigid ultra-high molecular weight polyethylene having an etched surface. To reduce corrosion of a metal, it may be coated with this polyethylene material and improve the coefficient of friction of the coil.

The use of a coil arrangement also provides for an inexpensive type of coupling, where concentricity of the connected units is provided. The length of the coil arrangement is determined by the overall width of the outer element to be connected to the inner element. Depending upon the relative sizes, the coil arrangement may be of the length of the outer element bore, thus assuring a better interconnection of the inner and outer elements.

The use of this type of connector also allows location of the connector anywhere along a shaft. This may happen in areas where a long shaft must be supported by bearings at various intervals by providing an appropriate compression unit which cooperates with the shaft or bearings. Such bearings may be located at any desired position along the shaft. No extensive machining is required on the shaft or the inner bearing race, because of the capability of the circular connector accommodating these variations.

Although various preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A circular coupling for interconnecting an inner rigid element to a surrounding outer rigid element, said coupling comprising a coil arrangement of a first inner and second outer coil having a plurality of intertwined turns adapted to surround such inner element and fit within a hole in such outer element and compression means adapted to compress said coil arrangement along its axial length for displacing contacting coil turns of said coil arrangement to engage such inner element with such outer element, said compression means being capable of compressing said coil arrangement to an extent to provide sufficient frictional engagement of said coil arrangement with such inner and outer elements, the configuration of such inner and outer surfaces being such to provide sufficient areas of frictional contact to interconnect said elements, one of first inner and second outer coils having a mean diameter which is slightly greater than the diameter of the other of said first inner and second outer coils to prearrange adjacent coil turns to direct displacement of the coil turns during compression and the second outer coil having an axial length greater than that of said first inner coil for displacing said second outer coil outwardly when said compression means axially compresses said coil arrangement.

2. A coupling of claim 1, wherein upon removal of said compression means, said coil relaxes to permit disconnection of such interconnected inner and outer elements.

3. A coupling of claim 1, wherein such inner element and said hole in such outer element are substantially circular.

4. A coupling of claim 1, wherein such outer element has a hole which is slightly larger than said coil arrangement to minimize the extent of coil turn displacement caused by said compression means to engage such inner element with such outer element.

5. A coupling of claim 1, wherein said coil turns have shaped faces which determine the direction of inward or outward movement of adjacent coil turns as said compression means compresses said coil.

6. A coupling of claim 1, with said first and second coils having coil turns shaped to present mating sloped faces.

7. A coupling of claim 1, adapted for use in coupling a machine element having a cylindrical bore to a shaft having a cylindrical surface, wherein said coil arrangement is positioned between said shaft and the cylindrical inner surface of said machine element defining said bore, said compression means cooperating with said shaft to cause an axial compression of said coil arrangement to interconnect said shaft with said machine element.

8. A coupling of claim 7, wherein the difference in diameters of said bore and said shaft is such to minimize the extent of coil turn displacement caused by said compression means to interconnect said shaft with said machine element.

9. A coupling of claim 7, wherein said coil arrangement is of an axial length less than the axial length of said bore.

10. A coupling of claim 1, wherein said compression means includes means for insertion between said shaft and bore surface at an open end thereof to ensure location of said coil within said bore prior to coil compression.

11. A coupling of claim 10, wherein said machine element has said bore extending therethrough with said shaft therein, said insert means being located at each end of said coil to ensure location of said coil within said bore.

* * * * *